United States Patent [19]

Meadows

[11] 4,060,839
[45] Nov. 29, 1977

[54] FLEXIBLE INFORMATION STORAGE DISC

[75] Inventor: Robert Alan Meadows, Richardson, Tex.

[73] Assignee: Texas Instruments Incorporated, Dallas, Tex.

[21] Appl. No.: 647,024

[22] Filed: Jan. 7, 1976

[51] Int. Cl.² .................. G11B 5/016; G11B 5/82; G01D 15/24; G11B 3/60
[52] U.S. Cl. ..................... 360/99; 274/39 A; 346/137; 360/135
[58] Field of Search .............. 360/99, 97, 98, 135, 360/133; 346/137; 274/39 R, 39 A

[56] References Cited

U.S. PATENT DOCUMENTS

| | | | |
|---|---|---|---|
| 3,603,742 | 9/1971 | Schuller | 360/99 |
| 3,729,720 | 4/1973 | Darling | 360/135 |
| 3,767,865 | 10/1973 | Schuller | 360/99 |
| 3,797,035 | 3/1974 | Hunt | 360/135 |
| 3,830,506 | 8/1974 | Ewert | 360/99 |
| 3,947,893 | 3/1976 | Hall | 360/133 |

Primary Examiner—Robert M. Kilgore

Attorney, Agent, or Firm—Rene E. Grossman; Stephen S. Sadacca

[57] ABSTRACT

A flexible information storage disc includes a central mounting portion and an outer body portion providing a surface area on which information may be recorded. The central mounting portion is provided with a least first and second apertures disposed radially outwardly with respect to the geometric center of the disc. The first and second apertures are respectively arcuately elongated in directions conforming to rotation of the disc about its geometric center. The leading end of the first aperture is defined by a pair of straight edges angularly intersecting at an apex and the leading end of the second aperture is defined by a single straight edge. The pair of intersecting straight edges of the central mounting portion bounding the leading end of the first aperture and the single straight edge of the central mounting portion bounding the leading end of the second aperture cooperate to provide three abutment edges arranged in respectively different planes normal to the disc for precisely locating the disc both radially and angularly.

16 Claims, 14 Drawing Figures

FLEXIBLE INFORMATION STORAGE DISC

This invention relates to flexible information storage discs and, more particularly, to such discs incorporating means for precisely locating the disc both radially and angularly.

Flexible information storage discs and particularly flexible magnetic recording discs commonly referred to as "floppy discs" have been utilized for the storage of digital and low quality sound recording and reproduction. These discs have utilized a single central locating aperture for radially locating the disc. In low quality sound recording such as that utilized in dictation equipment a manual tuning device is provided for approximately indexing the first recording track but no provision is made for precisely angularly locating the disc in the machine. The disc is rotated, generally by a frictional wheel located just within the perimeter of the disc, until the first information is reached. In digital applications, a similar approach is taken; however, when the first information is reached, it is automatically recognized by the digital equipment and processing begins at the particular location.

It is desirable to provide a flexible information storage disc which includes means for precisely locating the disc both radially and angularly. Such disc would not only provide an improvement in digital and sound recording, but would allow the recording of individual concentric tracks each containing a single video image which may be produced on a television type display device.

It is therefore an object of the present invention to provide an improved flexible information storage disc.

It is another object of the invention to provide a flexible information storage disc which includes means for precisely locating the disc both radially and angularly.

It is a further object of the invention to provide a flexible information storage disc including a central mounting portion with a pair of apertures for precisely locating the disc both radially and angularly as well as provide rotational drive to the disc.

Still another object of the invention is to provide a flexible magnetic recording disc which achieves one or more of the above objects.

These and other objects and advantages are achieved in accordance with the present invention in which a flexible information storage disc is provided which includes a central mounting portion and an outer body portion. The outer body portion provides a surface area, such as a magnetic surface area, on which information may be recorded. The central mounting portion is provided with at least first and second apertures disposed radially outwardly with respect to the geometric center of the disc. The first and second apertures are respectively arcuately elongated in directions conforming to rotation of the disc about its geometric center. The leading end of the first aperture is defined by a pair of straight edges angularly intersecting at an apex and the leading end of the second aperture is defined by at least a single straight edge. The pair of intesecting straight edges of the central mounting portion bounding the leading end of the first aperture and the single straight edge of the central mounting portion bounding the leading end of the second aperture cooperate to provide three abuttment edges arranged in respectively different planes normal to the disc.

In use, the first and second apertures respectively receive first and second pin members coupled to a rotational means. As soon as the rotational means begins rotation, the first and second pin members touch the abuttment edges of the first and second openings, respectively, the disc is precisely located both radially and angularly with respect to the rotational means.

BRIEF DESCRIPTION OF THE DRAWINGS

Still further objects, advantages and features of the invention will become apparent from the detailed description and claims when read in conjunction with the accompanying drawings wherein:

DETAILED DESCRIPTION OF THE INVENTION

Various aspects and features set forth in the following detailed description are provided herein for purposes of continuity, clarity and completeness; these features are claimed in copending U.S. patent application Ser. Nos. 647,022, 647,021, and 647,023, now U.S. Pat. No. 4,057,840, each filed of even date with and assigned to the assignee of the present invention.

Figure 1:
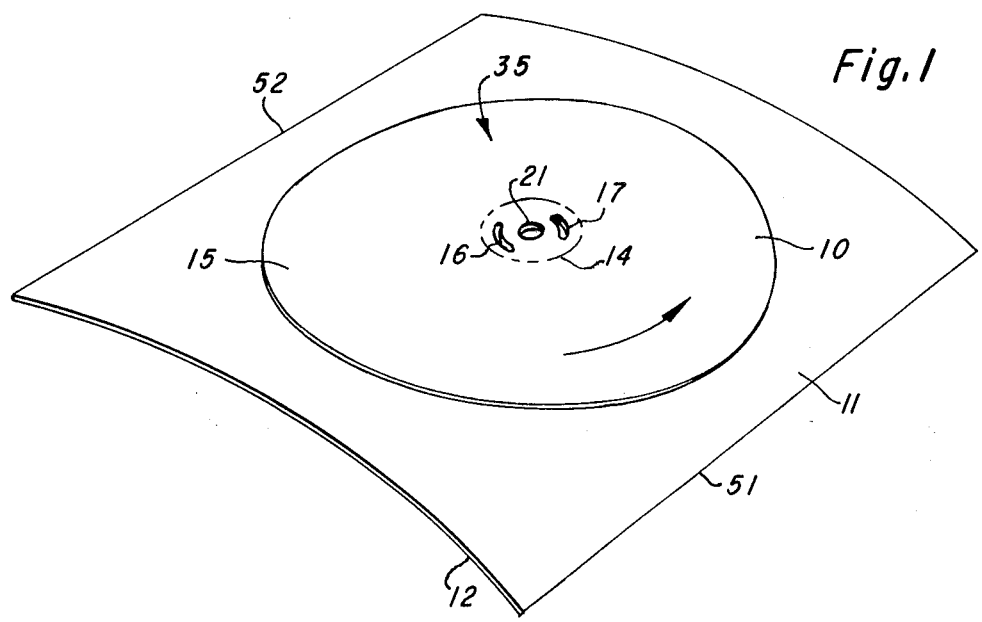
FIG. 1 is a perspective view of an apparatus embodying the present invention.
Figure 2:
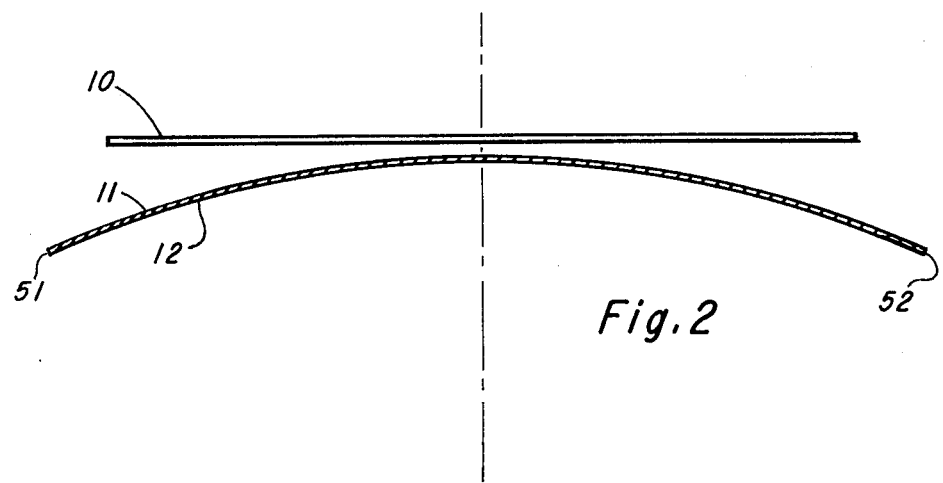
FIG. 2 is a cross-sectional view of the embodiment of FIG. 1.
Figure 3:
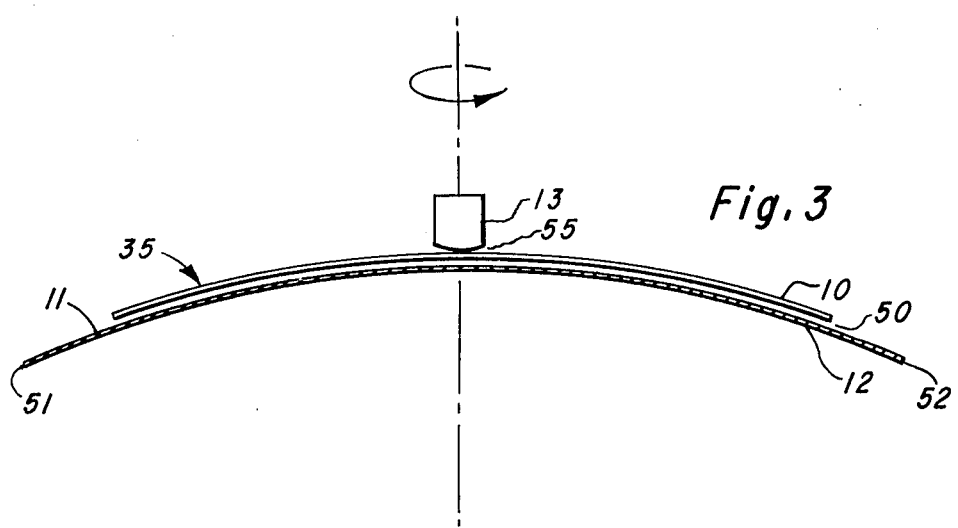
FIG. 3 is a cross-sectional view of the embodiment of FIG. 1 with the disc member in rotation.

Referring then to FIGS. 1-3, an apparatus for recording and/or reading information on the upper major surface 35 of a flexible information storage media 10 such as a flexible magnetic recording disc is shown. The apparatus is comprised of a body such as body 12 having a cylindrical surface or smoothing plane 11 wherein flexible disc 10 is rotated over cylindrical surface 11 with the lower major surface of such disc (opposite surface 35) facing cylindrical surface 11; rotation of disc 10 causes the disc to conform to the curvature of surface 11 of body 12 as shown in FIG. 3.

The information storage media includes a central mounting portion 14 and an outer body portion 15 providing a surface area on which information may be recorded. In the embodiment illustrated in FIG. 1, outer body portion 15 includes a layer of magnetic flux responsive material at surface 35 for magnetically recording the information. Central mounting portion 14 includes a pair of apertures 16 and 17 for coupling disc 10 to a rotational means to provide the rotational velocity to the disc and a third aperture 21 for mounting disc 10 in a housing. The significance of each of these apertures will be discussed in particular detail later in this specification with reference to FIGS. 7–13.

In this particular embodiment, the body 12 is comprised of a flexible spring material such as a conventional polyester mylar material of, for example, 7.5 mils in thickness. The mylar spring may be rigidly attached along the outer edges 51 and 52 while allowing the portion about the vertex at the central generatrix of the curve to be free to move up and down under the pressure of the record/read head with disc 10 in rotation.

Recording and/or playback is accomplished by positioning a record/read head 13 in contact with surface 35 of information storage disc 10 at selected positions along the vertex by outer body portion 15 of disc 10 as disc 10 conforms to the curvature of surface 11. The springiness of the mylar comprising body 12 combined with the air flow 50 between the disc and the surface 11 allows for a considerable latitude in vertical head positioning and head pressure. As head pressure is increased, head 13 pushes on disc 10 which deflects flexible body 12 by coupling through air layer 13 which now forms between disc 10 and surface 11 while disc 10 is in rotation. Thus, it is apparent that almost identical hade/media coupling is obtainable over a relatively wide range of head pressures and head heights.

The directrix of cylindrical surface 11 is preferably parabolic or circular, for example, having a 6 inch radius; although it is contemplated that other curved cylindrical surfaces of any desired size may be substituted therefor.

The surface of record/read head 13 which contacts surface 35 of disc 10 is curved to provide an air film or bearing 55 between head 13 and recording surface 35. For example, for a surface with a 6 inch radius the head may be contoured with a 4.0 inch radius.

Figure 4:
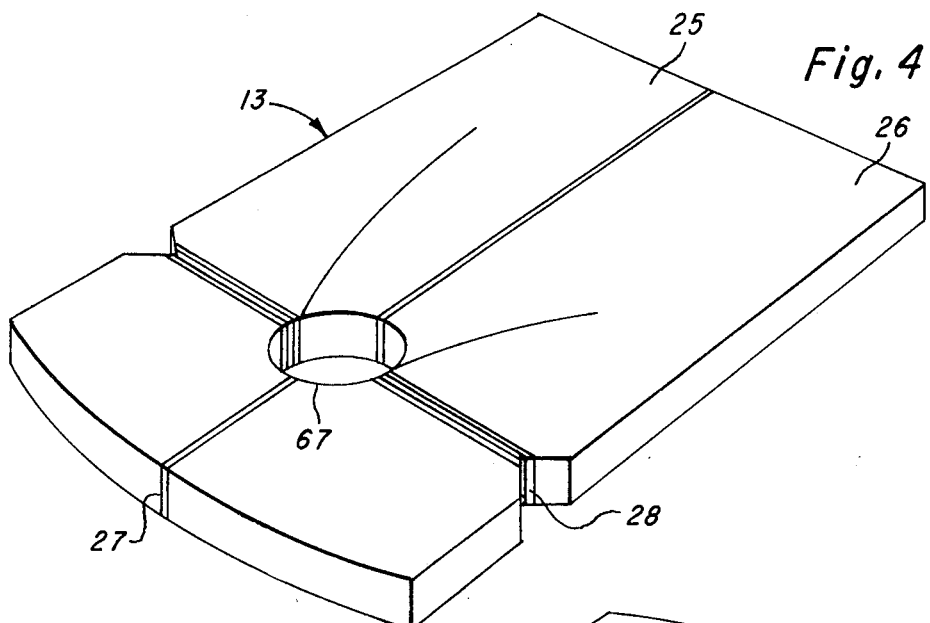
FIG. 4 is a perspective view of a magnetic recording and/or playback head utilized in conjunction with various embodiments of the present invention.

For magnetic recording, a magnetic record/replay head such as that shown in detail in FIG. 4 is utilized. The head is comprised of two metal or ferrite sections 25 and 26 separated by a 30–70 microinch gap 27. The sections 25 and 26 together provide a magnetic recording head 160–180 mils in width, for example, and about 5–6 mils in thickness. A coil 28 wrapped around the head through opening 67 selectively changes electrical energy to magnetic energy and/or magnetic energy to electrical energy for writing and/or reading information on a layer of magnetic flux responsive material formed on surface 35 of disc 10. The head may be comprised, for example, of Alfesil recording head material. The flux responsive material utilized for the magnetic type disc is, for example, comprised of a coating of magnetic particles such as that utilized on conventional recording tape formed on a polyester base material. The coated material which is commercially available in sheet form is cut into 2–5 inch diameter circles. A typical embodiment is cut, for example, to 3½ inches in diameter from standard 6 inch web material of the type used in video tape recording or high density digital tape recording. The material is, for example, co-doped Y-$Fe_2O_3$ media having a coercivity of 500 OER. The overall media thickness is, for example, 1–3 mils and the thickness of the magnetic coating is preferably 50 l microinches or more for the recording of long wavelengths in video applications. No special surface finish is required.

Figure 5:
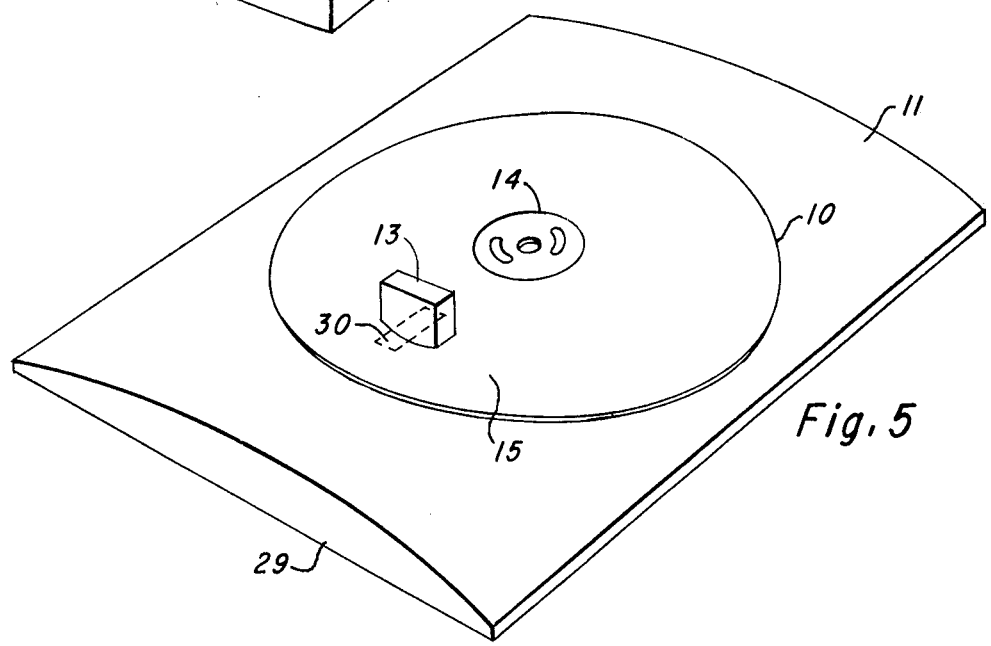
FIG. 5 is a perspective view of another embodiment of the inventon.
Figure 6:
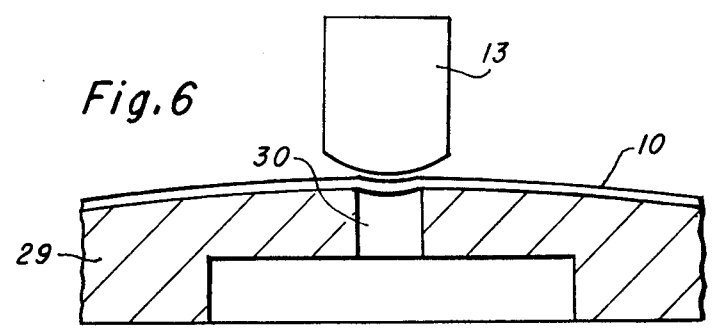
FIG. 6 is a partial cross-sectional view of the embodiment of FIG. 5.
Figure 7:
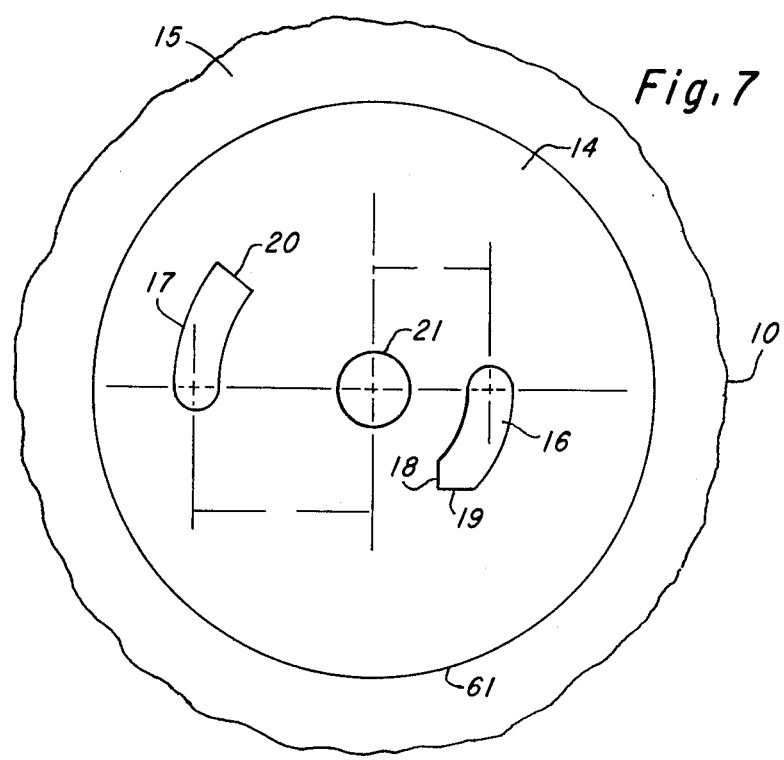
FIG. 7 is a partial top view of the central mounting portion of a flexible information storage disc utilized in accordance with various embodiments of the invention.

Referring to FIGS. 5 and 6, an embodiment is shown which is comprised of a rigid (rather than a flexible) body 29 having an opening or window 30 formed in the cylindrical surface 11 thereof. The body is comprised, for example, of a rigid plastic material or a metal material such as aluminum having a smooth or polished cylindrical surface 11. The information storage media, such as flexible disc 10, is rotated over cylindrical surface 11 with the lower major surface of disc 10 facing surface 11 so that rotation of disc 10 causes the disc to conform to the curvature of body 29. A recording and/or playback head 13 located over opening 30 is selectively positioned or indexed over the upper major surface of disc 10 for reading and/or writing information on disc 10 as it rotates. For the 160–180 mil wide recording head, such as that illustrated and described with respect to FIG. 4, the opening 30 is, for example, about 165–185 mils in width, respectively. The length of opening 30 is governed by the number of tracks or index positions which are provided with respect to the disc, each track or index position requiring at least one head thickness (i.e., greater than 5 mils). For example, a typical 3½ inch diameter disc may contain 20–40 tracks of recorded video information, each track representing a single frame still picture. The opening 30 compensates for variance in head pressures and head heights to provide a more uniform head/media coupling similar to that obtained with the spring flexible material of the embodiment of FIG. 2.

As previously mentioned with respect to FIG. 2, the flexible information storage disc 10 embodied in the present invention includes a central mounting portion 14 and an outer body portion 15 providing a surface area on which information may be recorded. In the preferred embodiment illustrated in detail in FIG. 7, central mounting portion 14 is provided with at least first and second apertures 16 and 17 disposed radially outwardly with respect to the geometric center of the disc. Apertures 16 and 17 are respectively arcuately elongated in directions conforming to rotation of the disc about its geometric center. The leading end of aperture 16 is defined by a pair of straight edges 18 and 19 angularly intersecting at an apex and the leading end of aperture 17 is defined by a single straight edge 20. The pair of intersecting straight edges 18 and 19 bounding the leading end of aperture 16 and the single straight edge 20 bounding the leading end of aperture 17 cooperate to provide three abutment edges arranged in respectively different planes normal to disc 10 for precisely locating disc 10 both radially and angularly. The single straight edge 20 of aperture 17 is preferably inclined along a radius extending from the geometric center of disc 10. One of the apertures 16 or 17 may be closer to the geometric center and respectively shorter in length than the other aperture in order to prevent the disc from being mounted 180° out of phase. The central mounting portion 14 may include one or more layers of reinforcing material 61 to prevent excessive wear of edges 18, 19 and 20. As will be discussed later, with respect to FIGS. 9-13, a housing may be provided containing disc 10. In such embodiment, disc 10 includes a third aperture 21 located in the approximate geometric center of the disc and the housing includes a retaining member extending through such third aperture for rotatably retaining the disc within the housing; the disc being free to rotate on such retaining member about its geometric center.

Figure 8:
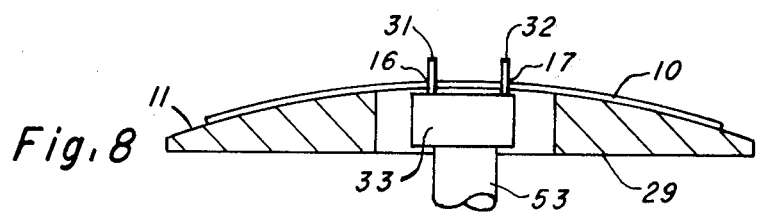
FIG. 8 is a cross-sectional view of the embodiment of FIG. 5 showing a rotational means coupled to the central mounting portion of the information storage disc shown in FIG. 7 with the disc in rotation.
Figure 9:
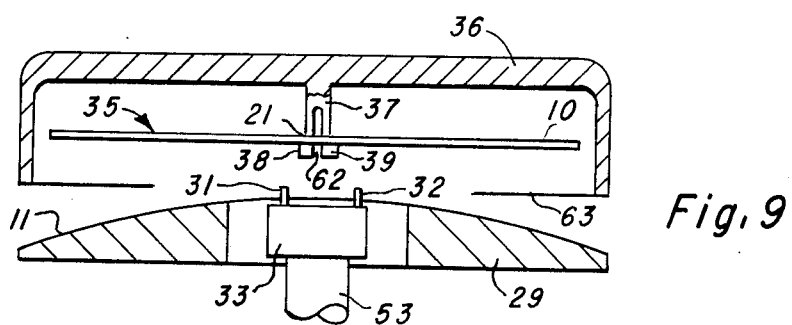
FIG. 9 is a cross-sectional view of the information storage disc of FIG. 8 contained within a housing to provide a cartridge which is mountable on the cylindrical surface of the embodiments shown in FIGS. 1 and 5.

As illustrated in FIG. 8, a corresponding rotational means 33 includes a pair of pin members 31 and 32 which are couplable to central mounting portion 14 of disc 10 by insertion into openings 16 and 17. Rotational drive is provided to rotational means 33 by shaft 53. The embodiment illustrated in FIG. 8 is similar to the embodiment of FIG. 5. The disc 10 is mounted on the cylindrical surface 11 of body 20 by placing the openings 16 and 17 over pins 31 and 32, respectively. As soon as rotational means 33 begins to rotate, pin 31 contacts leading edges 18 and 19 and pin 32 contacts leading edge 20 to precisely locate the disc both radially and angularly. As the rotating disc 10 picks up speed, the disc conforms to the curvature of the cylindrical surface 11 of body 29.

Referring now to FIGS. 9-13, as previously mentioned, disc 10 may be mounted within a housing such as plastic upper housing member 36. The member 36 which may contain a 3½ inch diameter disc may have a 3.75-4 inch square opening in the bottom thereof, for example, which fits over a 3.75-4 inch body 29 (or body 12 of FIG. 1). A retaining member 37 affixed to housing 36 extends through the centrally located opening 21 of disc 10 for retaining disc 10 in housing 36 with disc 10 being free to rotate on retaining member 37. Opening 21 is sufficiently large to permit some lateral movement of disc 10 on retaining member 37 so that only edges 18, 19 and 20 are critical to the precise alignment of disc 10. Retention member 37 is comprised, for example, of a cylindrical shaft which is smaller than centrally located opening 21 having an expanded portion, comprised of members 38 and 39, for example, which is larger than centrally located opening 21 for retaining disc 10 on shaft 37. Where the housing 36 is comprised of plastic, for example, shaft member 37 may be comprised of spring flexible plastic material and include a slot shaped opening 62 extending through the shaft wherein the expanded portion comprised of members 38 and 39 is compressible to the smaller size of the centrally located opening 21 for initially receiving disc 10. Members 38 and 39 then spring back to their original positions to retain the disc.

A thin flexible membrane 63 may be provided covering the large bottom opening which accepts the body 29 in order to further protect the disc 10 from contamination. Membrane 63 includes an aperture for receiving rotational means 33 with membrane 63 being conformable to the shape of cylindrical surface 11 when the body 29 is in place. Disc 10 would then rotate with its bottom major surface facing membrane 63; an air layer would then be formed between membrane 63 and disc 10 with the disc in rotation.

Figure 10:
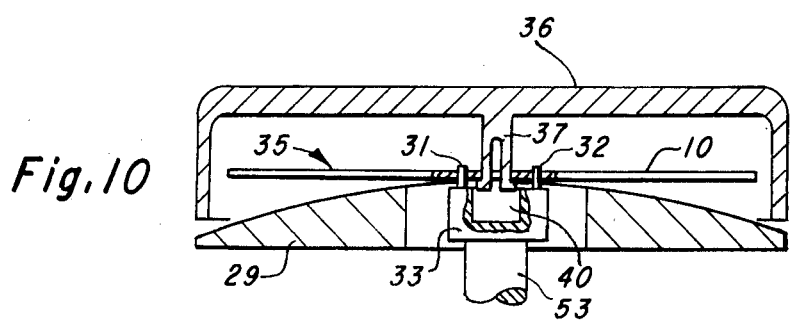
FIG. 10 is a cross-sectional view of the embodiment of FIG. 9 with the cartridge positioned over the body having the cylindrical surface and the rotational means mechanically coupled to the central mounting portion of the information storage disc.

FIG. 10 shows housing 36 being placed over body 29 with disc 10 being engaged by pins 31 and 32 of rotational means 33. An aperture 40 is provided in rotational means 33 for receiving shaft 37 as shown.

Figure 11:
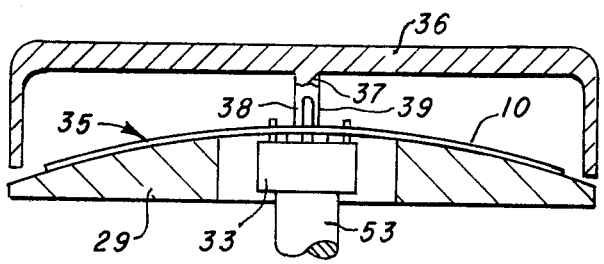
FIG. 11 is a cross-sectional view of the cartridge embodiments of FIGS. 9 and 10 with the rotational means coupled to the flexible disc, in rotation.

FIG. 11 shows housing 36 in place with rotational means 33 in rotation causing disc 10 to conform to the curvature of the cylindrical surface of body 29.

Figure 12:
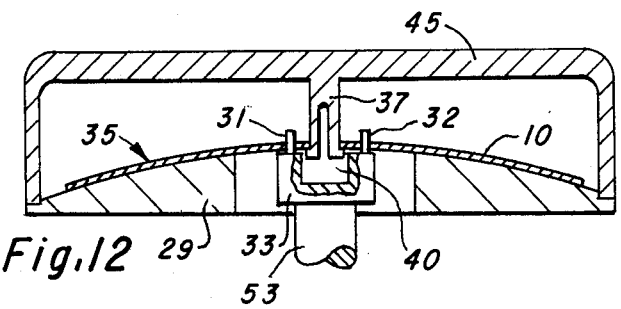
FIG. 12 is a cross-sectional view of another cartridge embodiment in which the body having the cylindrical surface is permanently affixed to the remainder of the housing to form an integral member of the cartridge.
Figure 13:
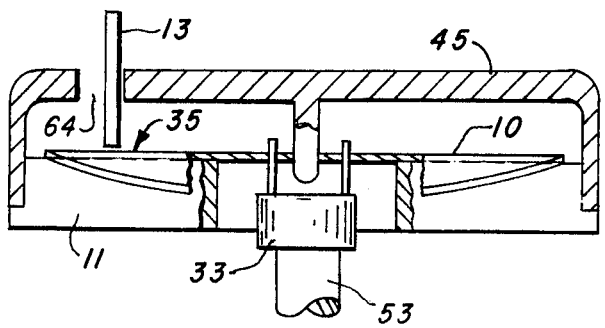
FIG. 13 is a right angled cross-sectional view of the embodiment as illustrated in FIG. 12.

In an alternate embodiment, as shown in FIG. 12, the cartridge may be comprised of a housing 45 which includes as an integral part thereof the smoothing plane provided by body 29 permanently affixed to the upper housing portion with disc 10 sealed within housing 45 between the upper body portion and the smoothing plane body 29. In this embodiment, the cartridge including the body 29 is placed over rotational means 33 for engagement of disc 10 by pins 31 and 32. As shown in FIG. 13, an opening 64 is provided in the upper portion of housing 45 (as well as in housing 36 of FIGS. 9-11) to receive recording/playback head 13 which respectively reads and/or writes information on recording surface 35 of disc 10. The opening 64 is sufficiently wide to permit indexing at various positions to allow recording and/or reading information at various concentric tracks of the disc.

Figure 14:
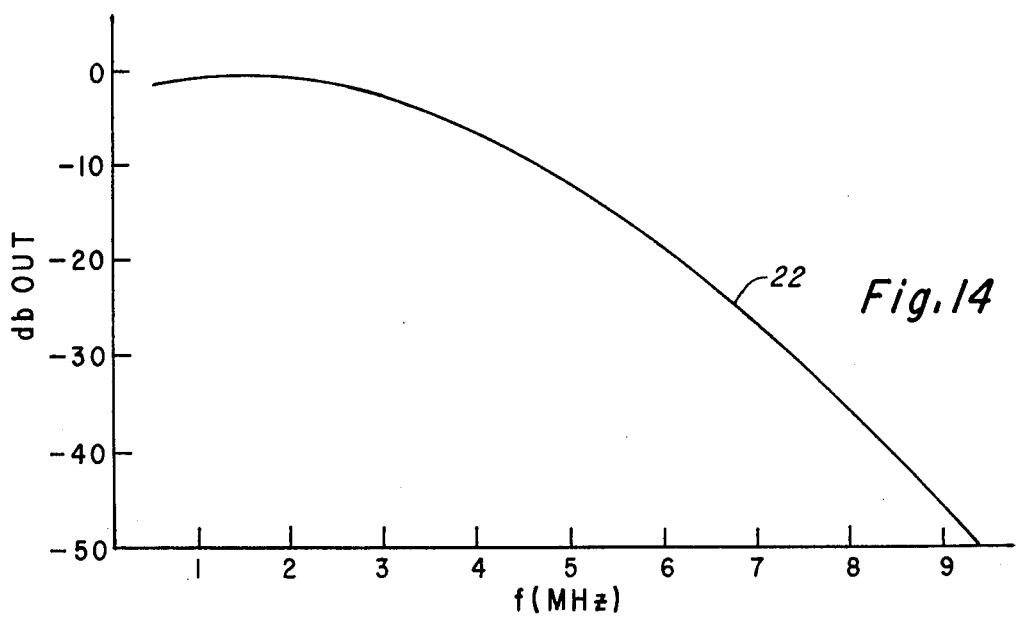
FIG. 14 is a graph showing an exemplary performance curve of Interface Output Voltage versus Frequency as generated by a model embodying the present invention.

FIG. 14 shows a curve 22 of plotted data representing the RF response of the playback interface provided by the above technique. The ordinate is the head/media voltage output expressed in dB. The abscissa is frequency in MHz. The data was taken after about 8 hours of continuous reproduction at 3600 RPM of a single magnetic track recorded at 3.1 inches diameter of a 3.5 inch diameter disc (584 IPS relative head/disc velocity). The conventional reproduction head had a gap length of 67 microinches. By comparison, the RF response provided in accordance with such exemplary embodiments of the present invention favorably compares with the performance of relatively expensive and complex quadrature and helical scan interfaces used in video tape recording equipment. In such video tape recording equipment, the video tape is stretched across elaborate scanner apparatus and is continuously replenished by tape movement.

Various embodiments of the invention have now been described in detail. It is anticipated that various modifications may be made to the described embodiments such as utilizing different materials of construction, or changing the shape or size of various elements thereof. Although the preferred embodiment of the invention utilizes magnetic recording techniques, other information storage techniques such as optical, electrical, or other recording and playback techniques may advantageously be provided on a flexible media in accordance with the present invention.

Since it is obvious that many additional changes and modifications can be made in the above-described details without departing from the nature and spirit of the invention, it is understood that the invention is not to be limited to said details except as set forth in the appended claims.

What is claimed is:

1. A flexible information storage media comprising:
   a sheet of flexible material including a central mounting portion extending radially outwardly from the approximate geometric center of said sheet,
   and an outer body portion integral with the central mounting portion and concentric therewith, said outer body portion providing a surface area on which information may be recorded,
   said central mounting portion being provided with at least first and second drive pin-receiving apertures disposed radially outwardly with respect to the approximate geometric center of said sheet and on opposite sides thereof, said first and second apertures being respectively arcuately elongated in directions conforming to rotation of said sheet about its geometric center, the leading end of said first arcuately elongated aperture being defined by a pair of straight edges angularly intersecting at an apex, the leading end of said second arcuately elongated aperture being defined by a single straight edge, the pair of intersecting straight edges of said central mounting portion bounding the leading end of said first aperture and the single straight edge of said central mounting portion bounding the leading end of said second aperture to provide three distinct drive pin abutment edges for a pair of drive pins with said edges being arranged in respectively different planes normal to the sheet.

2. The information storage media according to claim 1 wherein said sheet of flexible material is circular.

3. The information storage media according to claim 1 wherein said outer body portion includes a layer of magnetic flux responsive material for magnetic recording of said information.

4. The information storage media according to claim 1 wherein said sheet of flexible material is comprised of a plastic.

5. The information storage media according to claim 1 wherein the single straight edge of said second aperture is inclined with respect to all radians which extend from the center of said media and pass through said straight edge.

6. The information storage media according to claim 1 wherein said central mounting portion includes a layer of reinforcing material affixed thereto.

7. The information storage media according to claim 1 including a housing containing said sheet of flexible material, said housing including at least one opening in alignment with the central mounting portion of said sheet of flexible material for receiving a rotational means and a second opening in alignment with said outer body portion for receiving a recording and/or playback head.

8. The information storage media according to claim 7 wherein said sheet of flexible material includes a third aperture located in said approximate geometric center and wherein said housing includes a retaining member extending through said third opening for retaining said sheet of flexible material within said housing with said sheet of flexible material being free to rotate on said retaining member about its geometric center.

9. The flexible information storage media according to claim 1 wherein one of said apertures is disposed radially outwardly a greater distance with respect to the approximate geometric center of said sheet than the other of said apertures.

10. The information storage media according to claim 9 wherein the aperture radially disposed furthest from the geometric center of said sheet is longer than the other of said apertures.

11. The information storage media according to claim 10 wherein said second arcuately elongated aperture is radially disposed furthest from the geometric center of said sheet and is longer than said first aperture.

12. A flexible information storage media comprising:

a circular sheet of flexible plastic material including a central mounting portion extending radially outwardly from the geometric center of said circular sheet, and an outer body portion integral with the central mounting portion and concentric therewith, said outer body portion including a layer of magnetic flux responsive material providing a surface area on which magnetic information may be recorded, said central mounting portion being provided with at least first and second drive pin receiving apertures disposed radially outwardly with respect to said geometric center of said circular sheet and on opposite sides thereof, the leading end of said first aperture being defined by a pair of straight edges angularly intersecting at an apex, the leading end of said second aperture being defined by a single straight edge, the pair of intersecting straight edges of said central mounting portion bounding the leading end of said first aperture and the single straight edge of said central mounting portion bounding the leading end of said second aperture to provide three distinct drive pin abuttment edges for a pair of drive pins with said edges being arranged in respectively different planes normal to the circular sheet for precisely locating said sheet both radially and angularly.

13. The information storage media according to claim 12 wherein the single straight edge of said second aperture is included with respect to all radians which extend from the center of said media and pass through said straight edge.

14. The information storage media according to claim 12 wherein said central mounting portion includes a layer of reinforcing material affixed thereto.

15. The information storage media according to claim 12 including a housing containing said sheet of flexible material, said housing including at least one opening in alignment with the central mounting portion of said sheet of flexible material for receiving a rotational means and a second opening in alignment with said outer body portion for receiving a recording and/or playback head.

16. The information storage media according to claim 15 wherein said sheet of flexible material includes a third aperture located in said approximate geometric center and wherein said housing includes a retaining member extending through said third opening for retaining said sheet of flexible material within said housing with said sheet of flexible material being free to rotate on said retaining member about its geometric center.

* * * * *